United States Patent Office 2,894,942
Patented July 14, 1959

2,894,942

METHOD OF PREPARING AROMATIC AZOAMINO COMPOUNDS

William R. Hydro, New Kensington, Pa., and Theodore L. Willard, Minneapolis, Minn., assignors to The B. F. Goodrich Company, New York, N.Y., a corporation of New York No Drawing. Application December 19, 1956
Serial No. 629,212

18 Claims. (Cl. 260—205)

This invention relates to a method of preparing aromatic aminoazo compounds and more particularly pertains to a method of preparing aromatic aminoazo compounds by reacting a primary aromatic amine with an inorganic nitrite in the presence of a mineral acid or nitrous acid and a Friedel-Crafts catalyst to effect a rearrangement of the aromatic diazoamino compound to the aminoazo compound.

The aminoazo compounds can be reduced with hydrogen to yield an aromatic monoamine and an aromatic diamine. The aromatic diamines can serve as raw materials for preparing diisocyanates by reacting with phosgene or they may serve as starting materials for preparing antioxidants.

An object of the invention is the provision of a method for preparing aminoazoaryl compounds by reacting a primary aryl amine with a mineral acid and an inorganic nitrite in the presence of a Friedel-Crafts catalyst for a period of time that is considerably shorter than that used in any procedure heretofore.

Another object is the provision of a method for preparing aminoazoaryl compounds by reacting a primary aryl monoamine with hydrochloric acid and an alkali metal nitrite in the presence of a Friedel-Crafts catalyst, such as aluminum chloride, ferric chloride, boron trifluoride, toluene trifluoride or antimony chloride.

Still another object is the provision of a method for preparing aminoazoaryl compounds by reacting a primary aryl amine which is unsubstituted in the position para to the amino group, in a ratio of from about 2.5 to 11 moles of the amine for each mole of alkali metal nitrite from about 1.03 to about 1.3 moles of mineral acid for each mole of nitrite and from about 5 to about 200% (mole ratio 0.06 to 1.3) by weight based on the alkali metal nitrite of a Friedel-Crafts catalyst.

Numerous other objects will be apparent from the following description which discloses the invention in greater detail.

The above objects are accomplished by mixing together a large excess of the primary aryl monoamine as defined above, a mineral acid and a Friedel-Crafts catalyst, then adding the inorganic nitrite, either dry or in solution in water, controlling the temperature between about 0° C. and 50° C. during the addition of the nitrite, then heating to a temperature up to about 75° C. A portion of the amine is diazotized and the diazonium salt immediately couples with unreacted amine to form the diazoaminoaryl compound. Under the influence of the catalyst and heat up to 75° C. the diazoamino compound rearranges to the aminoazo compound. The mixture is then neutralized with an alkali, filtered and the aqueous layer is discarded. The mixture of unreacted amine and aminoazoaryl compound can be separated into its component parts by distilling the monoamine, preferably under reduced pressure if it is liquid at room temperature, or by fractional crystallization, or other known means for separating amines from aminoazoaryl compounds.

The amines which can be used include aniline, o-toluidine, m-toluidine, alpha-naphthylamine, beta-naphthylamine, 2,6-dimethyl aniline, 2,5-dimethyl aniline, 2-ethyl aniline, 2,5- and 2,6-diethyl aniline, 2-propyl aniline, 2-isopropyl aniline and the 2 butyl anilines, 2 chloro-aniline, 3 chloro-aniline, 2-ethyl-3-chloro-aniline and other aromatic monoamines which have only a hydrogen atom attached to the carbon atom para to the amino group, and which contain only halogen or hydrocarbon substituents on the remaining carbon atoms of the aryl nucleus.

The mineral acid can be any strong acid such as phosphoric, sulfuric, hydrochloric or hydrobromic. Concentrated sulfuric acid will cause side reactions and therefore if it is employed it should be diluted with water to prevent sulfonation of the aryl nucleus.

The nitrites that can be employed include sodium nitrite, potassium nitrite, lithium nitrite, calcium nitrite, barium nitrite, strontium nitrite, cesium nitrite or magnesium nitrite. The preferred nitrites are the alkali metal nitrites and most preferred is sodium nitrite. The nitrite salt can be added to the reaction mixture in the dry state if sufficient water, either from the acid or by deliberate inclusion is present, to dissolve the nitrite. Alternately, the nitrite can be added as a concentrated solution in water, which in the case of sodium nitrite is about 33% by weight.

The catalyst which we shall call Friedel-Crafts catalyst, include the metal halides such as aluminum chloride, aluminum bromide, antimony bromide, antimony chloride, ferric chloride, ferric bromide, boron trifluoride and toluene trifluoride

The catalyst need not be added in the anhydrous state, although the anhydrous form can be added if desired, because it readily becomes hydrated in the water of the reaction mixture.

The ratio of reacting ingredients is important. Based on the sodium nitrite as unity, the molar ratio of aryl monoamine unsubstituted in the position para to the amino groups should be at least 2.5 to 1 and not greater than about 11 or 12 to 1. The most preferred ratio is from about 5–10 moles of amine for each mole of nitrite. The molar equivalent ratio of acid to nitrite can be within the limits of about 1.03 to about 1.3 moles of acid for each mole of nitrite. Increasing the acid content from about 1.03 moles to about 1.3 moles tends to improve the yield or speed the rate of reaction. With increased quantities of acid the effectiveness of the catalyst becomes less apparent, and at an acid concentration of 1.5 molar equivalent for each mole of sodium nitrite the catalytic activity is no longer noticeable. The term molar equivalents is intended to indicate that for each mole of nitrite one mole of a monobasic acid or one mole of ionizable hydrogen is employed. If a polybasic acid is employed the truly molar concentration must be divided by the available hydrogen ions. Thus, if one mole of sodium nitrite is employed in a reaction, only one-half mole of sulfuric acid is needed because of the availability of two moles of ionizable hydrogen in each mole of acid.

The amount of catalyst can vary over limits of from about 0.03 to about 1.3 moles based on the nitrite.

The diazotization can be carried out at temperatures of from about 0° C. or lower to about 35° C. A temperature of 20–30° C. is preferred because of the rapidity with which the diazotization occurs and the ease with which temperature control can be achieved. The diazotization can be effected in a short time. In some instances as little as about 3 minutes will suffice, but it is preferred to permit from one-half to one hour for this phase of the reaction. After allowing a proper and sufficient time for the diazotization the temperature of the mixture is increased to about 40–75° C. to cause a rearrangement of the diazoaminoaryl to aminoazoaryl compounds. For this phase of the reaction a temperature of from about 45° C. to about 55° C. is preferred. The time needed for the rearrangement is surprisingly short and is usually complete in from about one-half to about three hours, depending in part on the temperature and in part on the concentration of Friedel-Crafts catalyst in the system, as a relatively high temperature and a concentration of catalyst of about one mole or slightly more per mole of nitrite each exerts its effect in accelerating the rearrangement.

There is some interdependence between reaction conditions, molar ratios of reactants and catalyst concentrations. At a molar ratio of 2.5 moles of aniline to one mole of $NaNO_2$ and 1.03–1.3 moles of HCl the yield of p-aminoazo benzene are low regardless of the rearrangement temperature. An increase of the aniline concentration from 2.5 to 5.0 moles, while keeping other conditions substantially constant will increase the yield of p-aminoazo benzene by about 10%. Increasing the molar concentration to about 10 moles of aniline with the remaining conditions constant causes a further increase in yield by about 10%. But additional aniline over about 11–12 moles per mole of $NaNO_2$ does not increase yield. At an aniline to sodium nitrite ratio of about 5 to 1 the catalyst increases the yield and decreases the reaction time. As dilution increases to 7.5 moles of aniline per mole of sodium nitrite the catalysts raise the yield slightly, but do not affect reaction time. As the dilution is further increased to a ratio of 10 moles of aniline per mole of sodium nitrite the catalyst shortens reaction time but appears to have little effect on yield.

The most desirable diazotization temperature is between 20 and 30° C., because considerably higher temperatures (45–50° C.) tend to decrease yield of the desired end product. High rearrangement temperatures (above about 75° C.) cause the reaction to proceed to completion faster, but side reactions which reduce the yield of p-aminoazo benzene are also accelerated. Low rearrangement temperatures of the order of about 0–10° C. require a long rearrangement time.

The following examples are intended to illustrate the invention but are not intended to be limitations thereon.

EXAMPLE I

A mixture of 750 grams of aniline and 83 grams of concentrated hydrochloric acid was prepared. Then 50 grams of sodium nitrite, dissolved in 150 ml. of water were added at a temperature of 20 to 31° C. The time consumed in adding sodium nitrite was about 6 minutes. An additional 15 minutes were allowed to complete the diazotization reaction. Vigorous stirring of the mixture was maintained during the diazo reaction. The water was then separated from the organic layer and the latter was neutralized with 15 parts of sodium carbonate until a negative Beilstein test for halides was shown. The volume of the neutralized mixture of diazoaminobenzene in aniline was 800 ml. This mixture was then divided into two equal 400 ml. portions. To one of these portions 11.375 grams of aluminum chloride were added. This latter mixture was then heated to a temperature up to about 55° C. The rearrangement of the diazoamino benzene to para-aminoazobenzene was completed in about 2 hours and 20 minutes. The yield of para-aminoazobenzene was about 85.4% of theory based on the sodium nitrite used. When aniline hydrochloride was added to the other 400 ml. portion of diazoaminobenzene in aniline and the rearrangement carried out at a temperature of about 55° C. in the presence of 6.1 grams of added aniline hydrochloride the time required for rearrangement was 6 hours and 25 minutes. The yield of para-aminoazobenzene was 87% of theory based on sodium nitrite.

EXAMPLE II

The amount of aluminum chloride can be increased to about 10 fold of that described in Example I without affecting the yield of para-aminoazobenzene. The diazoaminobenzene aniline mixture was prepared by the method described in Example I. To 425 ml. of neutralized diazoaminobenzene in aniline were added 113.75 parts of hydrated aluminum chloride. The temperature was then gradually raised from about 25 to about 65° C. The rearrangement was complete in slightly more than 1 hour.

EXAMPLE III

The aluminum chloride catalyst can be added to the mixture prior to diazotization. A mixture of 750 parts of aniline and 83 parts of concentrated hydrochloric acid and 175 parts of aluminum chloride was prepared. This mixture had a temperature of 34° C. 50 parts of sodium nitrite dissolved in 150 ml. of water were added to the reactants in a period of 12 minutes. During this addition the temperature of the mixture rose to 53–54° C. The mixture was permitted to react an additional 20 minutes to permit time for the rearrangement to go to completion. Thereafter the entire reaction mixture was poured into two liters of a methanol water solution which precipitated 121.1 parts of para-aminoazobenzene. This yield was 84.6% of theory based on sodium nitrite.

EXAMPLE IV

A mixture of 1124 parts aniline, 113.5 parts of concentrated hydrochloric acid and 102.3 parts of aluminum chloride was prepared. To this mixture was added a solution of 75 parts of sodium nitrite in 225 ml. of water over a period of 6 minutes. The temperature of the reaction mixture rose from 39° C. to 58° C. during the diazotization step. Thereafter the mixture was maintained between 55 and 60° C. for 22 minutes and the rearrangement was completed in that time.

EXAMPLE V

A mixture of 750 parts aniline, 75.8 parts concentrated hydrochloric acid and 11.4 parts of aluminum chloride was prepared. To this mixture were added 50 parts of sodium nitrite dissolved in 150 ml. of water. The sodium nitrite addition required 7 minutes and the diazotization temperature ranged between 39 and 60° C. The temperature of the reaction mixture was maintained between 53 and 70° C. for an additional 74 minutes, during which time rearrangement of the diazoaminobenzene to para-aminoazobenzene was complete. The latter was recovered from the mixture by dilution with a methanol water solution and separation of the precipitated para-amino-azobenzene by filtration. 111.4 parts of para-aminoazobenzene representing a yield of 78% based on the sodium nitrite was produced. The aniline-sodium nitrite ratio in this example was 11.1 to 1.

EXAMPLE VI 371 parts of aniline were mixed with 75.8 parts of concentrated hydrochloric acid and 11.4 parts of aluminum chloride. The sodium nitrite was added in the dry state over a period of 14 minutes. Diazotization temperature which was 44° C. at the start increased to 67° C. during addition of the nitrite. Cooling with water was necessary to maintain the reaction temperature at this level. The temperature was then increased slightly to about 70° C. and held between 60 and 70 for an additional 26 minutes, during which rearrangement occurred. 104.8 parts of para-aminoazobenzene representing a 73.3% yield based on sodium nitrite were recovered.

EXAMPLE VII

In the following example the aniline-sodium nitrite ratio is 5 to 1 and the aluminum chloride represents 10% of the sodium nitrite. 337 parts of aniline were mixed with 75.8 parts of concentrated HCl and 5 parts of aluminum chloride. 50 parts of sodium nitrite dissolved in 150 ml. of water were added over a period of 8 minutes. Diazotization temperature ranged between 26 and 48° C. Thereafter the temperature was increased to 60–70° C. for about 1 hour and 20 minutes. The yield of para-aminoazobenzene based on the sodium nitrite was 56.5%. In this instance the aniline-aluminum chloride ratio was about 1 to .03.

EXAMPLE VIII

By increasing the aluminum chloride content the yield of para-aminoazobenzene can be increased considerably. A mixture of 337 parts aniline, 75.8 parts of concentrated hydrochloric acid and 22.8 parts of aluminum chloride was prepared. To this mixture was added a solution of 50 parts sodium nitrite in 150 ml. of water at a temperature of 26 to 36° C. over a period of 16 minutes. Thereafter the temperature was raised to a high of 57° and held between 50 and 57° for about three-fourths of an hour. The yield of para-aminoazobenzene based on the sodium nitrite was 82.3%.

EXAMPLE IX

A mixture of 506 parts of aniline, 75.8 parts of hydrochloric acid and 22.8 parts of aluminum chloride was prepared. To this mixture was added a solution of 50 parts of sodium nitrite in 150 ml. of water over a period of about 11 minutes at a temperature between 24 and 36° C. The reaction mixture was then warmed to 45–50° C. In 2 hours time the rearrangement was completed and a yield of 80.8% of para-aminoazobenzene was recovered.

EXAMPLE X 506 parts of aniline were mixed with 75.8 parts of concentrated hydrochloric acid and 11.4 parts of aluminum chloride. To this mixture was added a solution containing 50 parts of sodium nitrite in 150 ml. of water. The addition of sodium nitrite required about 9 minutes and the temperature of diazotization ranged from about 26 to 45° C. The temperature of the reaction mixture was then raised to 55–65° C. for a period of slightly more than an hour at which time the rearrangement was complete. A yield of 82% of para-aminoazobenzene was recovered.

EXAMPLE XI

A mixture of 582 parts of ortho-toluidine, 75.8 parts of concentrated hydrochloric acid and 22.8 parts of aluminum chloride was prepared. To this mixture were added 50 parts of nitrite dissolved in 150 milliliters of water. The diazotization temperature was held between 23 and 29° C. The sodium nitrite addition required 11 minutes. Thereafter the mixture was heated to a temperature of 50° C. This heating step required a total of 40 minutes. The aqueous portion of the mixture and the suspended aluminum chloride were separated from the organic layer. This layer was divided into 2 increments of 105 milliliters each. To one these a mixture of 1100 milliliters of methanol and 2200 milliliters of water was added and allowed to stand overnight. A crop of bright orange crystals having a melting point of 99.5 to 100.5° C. was recovered. The para-aminoazotoluidine was reduced with hydrogen to yield 2,5-diaminotoluene and ortho-toluidine. A similar reaction occurs when meta toluidine is substituted for ortho-toluidine.

EXAMPLE XII

A mixture of 348 parts aniline, 75.8 parts of concentrated hydrochloric acid and 20.8 parts of a 48% solution of $BF_3$ in ether was prepared. Addition of the $BF_3$-ether complex to the aniline caused much sputtering and evolution of gas. 50 parts of sodium nitrite in 150 milliliters of aniline were added gradually at a temperature between 18 and 28° C. over a period of 20 minutes. Thereafter the temperature was raised to about 50° C. and held there for about 37 additional minutes. A 75.2% yield of para-aminoazobenzene was recovered. During the entire run ether vapors were given off.

EXAMPLE XIII

A mixture of 348 parts of aniline, 75.8 parts of concentrated hydrochloric acid and 2.5 parts of $SbCl_3$ was prepared. To this mixture were added 50 parts of sodium nitrite dissolved in 100 milliliters of water. The diazotization step was carried out at a temperature between 22 and 37° C. over a period of 15 minutes. Thereafter the mixture was heated between 40 and 65° C. for about one hour. A yield of 89.6% of para-aminoazobenzene was recovered.

EXAMPLE XIV

The same reaction mixture as that described in Example XIII was prepared with the exception that toluene trifluoride

was substituted for the antimony chloride. To this mixture were added 50 parts of sodium nitrite dissolved in 100 milliliters of water. The diazotization temperature ranged from 19 to 42° C. and required 24 minutes. Thereafter the mixture was heated between 57 and 61° C. for 100 minutes. The yield of para-aminoazobenzene was 67.2% of theory based on sodium nitrite.

EXAMPLE XV

In this example the reaction ingredients were used in the same proportions as that shown in the previous example with the exception, however, that ferric chloride was substituted for the toluene trifluoride. The diazotization was carried out at a temperature between 14 and 30° C. over a period of 40 minutes. Thereafter the mixture was heated between 63 and 62° C. for about 100 minutes. The yield of para-aminoazobenzene was 70.8% of theory.

EXAMPLE XVI

In this example a mixture of 341 milliliters of aniline, 64.2 milliliters of concentrated HCl, 10 parts by weight of aluminum chloride and 50 parts by weight of dry sodium nitrite were used. The aniline, hydrochloric acid and aluminum chloride were mixed and the sodium nitrite was added in the dry state in small increments over a period of 11 minutes. The diazotization temperature ranged from 15 to 25° C. Thereafter the temperature was raised to about 50° C. for 27 minutes. During this time a yield of 88.7% of para-aminoazobenzene was formed. This indicates that the rearrangement reaction occurs even in the presence of only very small quantities of water. The other aromatic amines described above can also be reacted in the presence of the remaining Friedel-Crafts catalyst described herein to form the corresponding para-aminoazo derivatives.

A series of runs were made in which the mole ratio of aniline to sodium nitrite, the ratio of aluminum chloride to sodium nitrite, the rearrangement temperature, and the time required for the entire reaction were varied. In all instances the molar ratio of HCl to NaNO₂ was 1.03 to 1.

Table 1

PREPARATION OF P-AMINOAZOBENZENE

| Example | Mole Ratio Aniline Sodium Nitrite | Percent AlCl₃6H₂O Wt. Percent Sodium Nitrite | Temp. of Rearrangement, °C. | Total Time, Minutes | Diazoamino benzene Unconverted, Percent | Percent Yield p-Aminoazo benzene |
|---|---|---|---|---|---|---|
| XVII | 5.0 | 10 | 50 | 232 | 0.7 | 69.3 |
| XVIII | 7.5 | 10 | 50 | 281 | 4.9 | 75.3 |
| XIX | 5.0 | 5 | 50 | 268 | 15.2 | 67.0 |
| XX | 5.0 | 5 | 50 | 309 | 2.1 | 66.9 |
| XXI | 5.0 | 20 | 50 | 114 | 7.5 | 67.7 |
| XXII | 2.5 | 10 | 50 | 194 | 14.0 | 36.1 |
| XXIII | 5.0 | 10 | 60 | 86 | 11.2 | 61.7 |
| XXIV | 5.0 | 10 | 60 | 111 | 0 | 71.7 |
| XXV | 5.0 | 10 | 40 | 279 | 26.3 | 53.6 |
| XXVI | 5.0 | 10 | 40 | 423 | 10.6 | 70.0 |
| XXVII | 2.5 | 10 | 60 | 119 | 1.4 | 53.7 |
| XXVIII | 2.5 | 10 | 40 | 280 | 28.8 | 28.8 |
| XXIX | 5.0 | 20 | 40 | 248 | 13.0 | 75.7 |
| XXX | 5.0 | 10 | 65 | 70 | 0.0 | 78.0 |
| XXXI | 5.0 | 10 | 75 | 70 | 0.2 | 75.0 |

The data of the table show that molar ratio of aniline to sodium nitrite, catalyst concentration, and temperature of rearrangement and time of reaction each has some influence on the yield of p-aminoazobenzene.

Nitrites which yield HNO₂ on treatment with a strong aqueous mineral acid can be used in place of sodium nitrite. Aqueous mineral acids other than hydrochloric which form HNO₂ by reaction with nitrite salts can be used in the diazotization step.

Other mono-amino aromatic compounds, as specifically set out hereinbefore, which are unsubstituted in the para-position can be employed to produce para-aminoazo derivative by the process of this invention.

Although the invention is described by reference to specific examples, it is believed apparent that there are numerous modifications in proportions of reaction ingredients and reaction conditions which are within the scope and spirit of the appended claims.

We claim:
1. A method for preparing aromatic aminoazo compounds comprising diazotizing at a temperature between about 0 and 50° C. an aromatic monoamine having a hydrogen atom on the carbon atom para to the amino group, said monoamine being selected from the class consisting of unsubstituted aromatic monoamines, halogen substituted aromatic monoamines and lower alkyl substituted aromatic monoamines of the benzene series, with a nitrite and from about 1.03 to about 1.3 molar equivalents based on the nitrite of a mineral acid, said monoamine being present in a ratio of at least 2.5 and not more than about 11 moles for each mole of nitrite to thereby form a diazoamino compound and rearranging the diazoamino compound in the presence of from about 0.06 to about 1.3 moles based on the nitrite of a Friedel-Crafts catalyst at a temperature up to about 75° C.

2. The method of claim 1 in which the catalyst is aluminum chloride.

3. The method of claim 1 in which the catalyst is BF₃.

4. The method of claim 1 in which the catalyst is SbCl₃.

5. The method of claim 1 in which the catalyst is

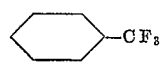

6. A method of preparing

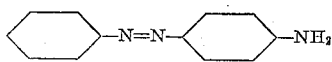

comprising diazotizing aniline at a temperature of from about 0° C. to about 35° C. in a mixture containing water, from about 2.5 to about 11 moles of aniline for each mole of nitrite and from about 1.03 to about 1.3 molar equivalents of mineral acid for each mole of nitrite, and rearranging the diazoaminobenzene to

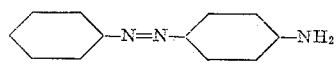

in the presence of from about .06 to about 1.3 moles based on the nitrite of a Friedel-Crafts catalyst at a temperature up to about 75° C.

7. The method of claim 6 in which the catalyst is BF₃.

8. The method of claim 6 in which the catalyst is SbCl₃.

9. The method of claim 6 in which the catalyst is

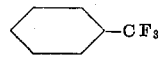

10. The method of preparing para-aminoazotoluidine comprising diazotizing ortho-toluidine at a temperature of from about 0° C. to about 35° C. in a mixture containing water, a nitrite and from about 1.03 to about 1.3 molar equivalents based on the nitrite of a mineral acid, said ortho-toluidine being present in a ratio of at least 2.5 moles and not more than about 11 moles for each mole of nitrite, and rearranging the diazoaminotoluene at a temperature up to about 75° C. in the presence of from about .06 to about 1.3 moles based on the nitrite of a Friedel-Crafts catalyst.

11. The method of claim 10 in which the catalyst is BF₃.

12. The method of claim 10 in which the catalyst is SbCl₃.

13. The method of claim 10 in which the catalyst is

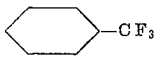

14. The method of preparing aromatic aminoazo compounds comprising diazotizing in a mixture containing water, nitrite and hydrochloric acid at a temperature of from about 0° C. to about 35° C. an aromatic monoamine of the benzene series having unsubstituted the carbon atom para to the amino group, said monoamine being selected from the class consisting of unsubstituted monoamines, halogen substituted monoamines and lower alkyl substituted monoamines of said series, said amine being present in a ratio of from about 5 to about 10 moles for each mole of nitrite, said acid being present in a ratio of from about 1.03 to about 1.3 molar equivalents for each mole of nitrite, and rearranging the diazoamino aromatic compound so formed at a temperature between about 40° C. and 75° C. in the presence of from about .06 to about 1.3 moles based on the nitrite of a Friedel-Crafts catalyst to thereby form an aminoazo derivative of said monoamine.

15. The method of claim 14 in which the amine is aniline and the product formed is para-aminoazobenzene.

16. The method of claim 14 in which the amine is ortho-toluidine and the product formed is para-aminoazotoluidine.

17. The method of claim 14 in which the amine is aniline in a ratio of from about 5 to 7.5 moles per mole of nitrite and the catalyst is aluminum chloride.

18. The method of claim 14 in which the amine is ortho-toluidine in a ratio of from about 5 to 7.5 moles for each mole of nitrite and the catalyst is aluminum chloride.

References Cited in the file of this patent

UNITED STATES PATENTS 1,977,266   Dahlen _____ Oct. 16, 1934

UNITED STATES PATENT OFFICE

CERTIFICATE OF CORRECTION

Patent No. 2,894,942

July 14, 1959

William R. Hydro et al.

It is hereby certified that error appears in the printed specification of the above numbered patent requiring correction and that the said Letters Patent should read as corrected below.

Column 5, line 73, for "layer" read -- later --.

Signed and sealed this 3rd day of May 1960.

(SEAL)
Attest:

KARL H. AXLINE
Attesting Officer

ROBERT C. WATSON
Commissioner of Patents